Patented Apr. 10, 1945

2,373,135

UNITED STATES PATENT OFFICE 2,373,135

TREATMENT OF HYDROXYLATED POLYMERS

Robert William Maxwell, Seaford, Del., assignor to E. I. du Pont de Nemours & Company, Wilmington, Del., a corporation of Delaware No Drawing. Application April 14, 1942, Serial No. 438,949

12 Claims. (Cl. 260—9)

This invention relates to hydroxylated polymers, and more particularly to the insolubilization thereof.

Hydroxylated polymers, such as cellulose, incompletely substituted cellulose ethers and esters, hydroxylated rubber, polyvinyl alcohol, and the like are materials of a high degree of utility. In certain applications, however, these polymers show certain deficiencies, such as insufficiently high softening or decomposing point, inadequate mechanical properties and the like. The inadequacies of these materials in these respects are frequently at least partially remedied by previously disclosed treatments, and numerous materials have been suggested for this purpose, but most of them have a disadvantageouly low solubility in practical solvents, as well as low compatibility with the hydroxylated polymers to be modified. Furthermore, many of these agents show excessive tendency to react, under the conditions of reaction, not only with the hydroxylated polymer but also intermolecularly with further molecules of the treating agent to form polymers. This not only reduces the efficiency of the materials as treating agents but also, because of the polymer formation, may adversely affect the resulting product. In certain cases, the modifying agent tends to cause discoloration of the hydroxylated polymeric material.

This invention has as an object the provision of a process for the insolubilization of hydroxylated polymeric materials. A further object is the provision of a process for insolubilizing hydroxylated, i. e., hydroxyl containing, polymeric materials predominantly by reaction with the treating agent. Other objects will appear hereinafter.

These objects are accomplished by the following invention wherein a hydroxylated polymer is heated with a monocyclic N,N'-bis(alkoxymethyl)-urea, i. e., an N,N'-bis(alkoxymethyl) substituted monocyclic urea of the formula:

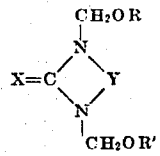

where X is a chalcogen of atomic weight less than 33, i. e., oxygen or sulfur; R and R', which may be identical or different, represent the non-hydroxy portion of a monohydric alcohol boiling below 210 C. at 760 mm.; and Y is a divalent acyclic organic radical of chain length 2 or 3, both terminal atoms of which are carbon, any other chain member present being carbon, oxygen, sulfur, or tertiary nitrogen, and wherein all hydrogen atoms are attached only to carbon, at a temperature and for a time sufficient for the polymer to become insoluble in solvents for the untreated polymer.

In the practice of this invention an intimate mixture of the hydroxylated polymeric material and a monocyclic N,N'-bis(alkoxymethyl)urea is heated at an elevated temperature for a time sufficient to render the hydroxylated polymer substantially insoluble in a solvent for the untreated polymer. The bis(alkoxymethyl)urea is generally employed in proportions of 0.5–100% by weight of the hydroxylated polymeric material and preferably 3–10% by weight of the hydroxylated polymeric material. The temperature employed to effect the insolubilization of the hydroxylated polymeric materials is determined by the nature of the latter and the properties desired in the final product. Thus, it is not possible to state a definite temperature range applicable to all hydroxylated polymeric materials since, for example, a temperature of 80° C. is sufficient for some, while others require 160° C. or even higher. It can only be said that, in general, temperatures above 200° C. are unnecessary, that a range of 80–160° C. is satisfactory for most materials, and that with some materials temperatures as low as 70° C. may be employed particularly in the presence of larger amounts of catalysts. Although with most hydroxylated polymeric materials the reaction between the N,N'-bis(alkoxymethyl)-urea and the hydroxylated polymeric material can be effected without the use of a catalyst, in some instances it is desirable to employ a catalyst of the type used in acetal interchange reactions, which is generally an acidic catalyst.

A convenient method of carrying out the process of the invention is to dissolve the hydroxylated polymeric material and the N,N'-bis(alkoxymethyl)urea in a mutual solvent and either heat the solution or remove the solvent and then heat. The process can also be carried out by dissolving the N,N'-bis(alkoxymethyl)urea in a suitable solvent, immersing the hydroxylated polymeric material in the solution and then heating the hydroxylated polymeric material either while in contact with the treating solution or after removing it from the main body of the solution. It is also possible to carry out the process of this invention by impregnating the hydroxylated polymeric material with a N,N'-bis(alkoxymethyl)- urea in the absence of a solvent, followed by heating to the desired temperature.

The products used in the process of this invention are, for convenience, hereinafter referred to simply as bis(alkoxymethyl)ureas, by which it is understood that only monocyclic N,N'-bis(alkoxymethyl) alkyl, substituted alkyl or acyl ureas of the type discussed above are meant. The term is also understood to mean the corresponding thioureas.

The more detailed practice of the invention is illustrated by the following examples, wherein parts given are by weight. There are of course many forms of the invention other than these specific embodiments.

Example I

Ten parts of N,N'-bis(methoxymethyl)uron and 0.2 part of citric acid as a catalyst are dissolved in 41.8 parts of water. A piece of muslin is immersed in this solution for 5 minutes and then dried at room temperature. The dried material is heated at 170° C. for 3 minutes. The treated muslin is markedly superior in crease resistance to the untreated fabric.

Example II

A mixture of 15 parts of cellulose acetate (54.5% combined acetic acid), 85 parts of acetone, and 0.525 part of N,N'-bis(methoxymethyl)-uron [tetrahydro-3,5-bis(methoxymethyl)-1,3,5-oxadiazin-4-one] is agitated until homogeneity is obtained. The resulting solution is poured onto a glass plate and then spread to an even layer by means of a leveling blade. The film thus formed is aged for approximately one-half day in a dry atmosphere and the last traces of solvent are removed by heating at 65° C. for three days, this mild heat treatment being insufficient to impart insolubility to the cellulose acetate. The film is then heated at 160° C. for 90 minutes. The film after this treatment is insoluble in acetone, whereas a film prepared and heated in the same manner but containing no N,N'-bis(methoxymethyl)uron is readily soluble in acetone.

The N,N'-bis(methoxymethyl)uron is prepared by the method of Kadowaki (Bull. Chem. Soc. (Japan) 11, 248–61 (1936)). A mixture of 220 parts of formaldehyde (37% aqueous), 36 parts of urea, and 3.6 parts of barium hydroxide is heated at 90° C. for 20 minutes. The solution is concentrated and the resulting viscous residue dissolved in 500 parts of methanol containing 3.8 parts of concentrated hydrochloric acid. After the mixture has stood one hour the hydrochloric acid is neutralized and the methanol removed by distillation. The residue is dissolved in chloroform and the insoluble material filtered off. After removing the chloroform by distillation, the product is distilled. It is water-white and boils at 111–113° C. at 2 mm. N,N'-bis-(ethoxymethyl)uron, B. P., 6–7 mm. 150–155° C.; N,N'-bis(butoxymethyl)uron, B. P. 3–4 mm. 158–160° C., and N,N'-bis(ethoxyethoxymethyl)uron, B. P. 1–2 mm. 90–95° C. are similarly prepared.

Example III

Fifteen parts of cellulose acetate (54.5% combined acetic acid) and 1.5 parts of N,N'-bis(methoxymethyl)uron are dissolved in 85 parts of acetone and cast into a film as described in Example II. The film is heated at 160° C. for 90 minutes and after this treatment is insoluble in acetone.

Example IV

Fifteen parts of cellulose acetate (54.5% combined acetic acid) and 2.25 parts of N,N'-bis(methoxymethyl)uron are dissolved in 85 parts of acetone and cast into a film by the method described in Example II. The film is heated at 160° C. for 90 minutes and after this treatment is insoluble in acetone.

Example V

Five parts of xylene, 1 part of hydroxylated rubber, 1.5 parts of N,N'-bis(methoxymethyl)uron and 0.1 part of p-toluenesulfonic acid are heated at 125–130° C. Within 5 minutes insolubilized hydroxylated rubber begins to separate and within 10 minutes the mass becomes quite stiff. A xylene solution of hydroxylated rubber containing no N,N'-bis(methoxymethyl)uron undergoes no apparent change when heated for 3½ hours at 125–130° C.

The hydroxylated rubber used in the above example is prepared as follows: Fifty parts of 90 plasticity pale crepe rubber, 25 parts of 1,3,5-trioxane, 5 parts of zinc chloride, and 13 parts of glacial acetic acid are placed in a Werner & Pfleiderer mixer and agitated for 15 minutes in order to insure good mixing. The reaction mixture is then heated at 60–70° C. for a period of one hour, after which the contents of the mixer are cooled and placed on a rubber wash mill. After washing for 15 minutes with water (25–30° C.) the rubbery mass is blown partially dry with air. Approximately 1% of N-phenyl-alpha-naphthylamine is then added and the rubber mass placed on a small roll mill and heated to remove the remaining water.

Example VI

A solution containing 95 parts of polyvinyl alcohol, 540 parts of water, 5 parts of N,N'-bis(methoxymethyl)uron and 1 part of p-toluenesulfonic acid is poured onto a glass plate. The solution is spread to an even layer by means of a leveling blade and the water allowed to evaporate at room temperature. The film is heated at 80° C. for 5 minutes. The resulting film is insoluble in water at all temperatures, whereas a film prepared and heated in the same manner, but without the use of N,N'-bis(methoxymethyl)uron, is readily soluble in water.

Example VII

Ten parts of N,N'-bis(methoxymethyl)uron and 0.4 part of p-toluenesulfonic acid are dissolved in 89.6 parts of water. A skein of viscose rayon yarn (150 denier, 40 filament) of 10 parts in weight is immersed in this solution and then dried by centrifuging and exposing to air room temperature. The dried skein is heated to 105° C. for 3 minutes, washed in mild soap solution at 70° C., rinsed, and dried. Its weight is now 10.74 parts; the increase in weight corresponds to a gain of 7.4% based on the original weight of the yarn. The treated yarn is insoluble in cuprammonium solution upon 48 hours' contact at room temperature, whereas untreated rayon yarn dissolves completely in the same reagent within two hours. The treated yarn is superior to an untreated yarn control in several respects indicated by the following tests:

1. *Resistance to creasing.*—Treated and untreated yarns which have been conditioned at 25° C. and 50% relative humidity are wound separately over a double edge knife blade under a uniform tension of 60 g. After 15 minutes the tension is released and each thread cut along one edge of the knife blade. The creased segments of the yarn are allowed to relax for 10 minutes while lying on a horizontal, smooth surface. The degree that the thread recovers from the creasing is an index of its resilience, and the angle formed by the thread is known as the crease angle. For treated yarn the crease angle is 126°, whereas for untreated yarn it is 95°; thus with reference to the untreated yarn, the treated yarn is 32% better in resistance to creasing.

2. *Elastic recovery.*—Segments of treated and untreated yarn which are 4.000 inches in length are rapidly stretched by 4% (i. e., to 4.160 inches) and held in the elongated position for 100 seconds before tension is released. After releasing the tension, the treated yarn spontaneously contracts 0.106 inch during the first 60 seconds, whereas the untreated yarn contracts only 0.077 inch in this same period of time. The relative superiority in elastic recovery conferred by this treatment is thus 38%.

3. *Swelling.*—Skeins of treated and untreated yarns of known weight are conditioned at 25° C. and 50% relative humidity until they are constant in weight. They are thoroughly wet with water, subjected to a short centrifugation and then quickly weighed in a covered dish. The gain in weight of untreated yarn is 100%, while the treated yarn gains only 46% in weight. Relative to untreated yarn, the swellability is reduced by 118%. This modification in properties indicates great improvement in the ease and rapidity of drying of treated fabrics, e. g., after dyeing or laundering procedures.

*Example VIII*

A solution containing 95 parts of polyvinyl alcohol, 540 parts of water, 5 parts of tetrahydro-1,3-bis(methoxymethyl)-5-methyl-2(1)-s-triazone and one part of p-toluenesulfonic acid is poured onto a glass plate. The solution is spread to an even layer by means of a leveling blade, and the water allowed to evaporate at room temperature. The film is heated at 80° C. for 5 minutes. The resulting film is insoluble in water even at the boiling point, whereas a film prepared and heated in the same manner but without the use of tetrahydro-1,3-bis(methoxymethyl)-5-methyl-2(1)-s-triazone is still soluble in water.

*Example IX*

A solution containing 95 parts of polyvinyl alcohol, 540 parts of water, 5 parts of N,N'-bis(methoxymethyl)ethylene urea and one part of p-toluenesulfonic acid is poured onto a glass plate. The solution is spread to an even layer by means of a leveling blade, and the water allowed to evaporate at room temperature. The film is heated at 80° C. for 5 minutes. The resulting film is insoluble in water at all temperatures, whereas a film prepared and heated in the same manner but without the use of N,N'-bis(methoxymethyl)ethylene urea is soluble in water.

*Example X*

Ten parts of tetrahydro-1,3-bis(methoxymethyl)-5-methyl-2(1)-s-triazone, 2 parts of acetic acid and 0.4 part p-toluenesulfonic acid are dissolved in 87.6 parts of water. A skein of viscose rayon yarn (115 denier, 40 filament) of ten parts in weight is immersed in this solution and then dried by centrifuging and exposing to air at room temperature. The dried skein is heated to 140° C. for 3 minutes, washed in mild soap solution at 70° C., rinsed and dried. Its weight is now 10.7 parts; the increase in weight corresponds to a gain of 7% based on the original weight of yarn. The treated yarn is superior to an untreated yarn control in several respects, indicated by the following tests:

1. *Resistance to creasing.*—For treated yarn the crease angle (see Example VII) is 122, whereas for untreated yarn it is 95°; thus, with reference to the untreated yarn, the treated yarn is 28% better in resistance to creasing.

2. *Elastic recovery.*—Segments of treated and untreated yarn which are 4.000" in length are rapidly stretched by 4% (i. e., to 4.160") and held in the elongated position for 100 seconds before tension is released. After releasing the tension, the treated yarn spontaneously contracts 0.091" during the first 60 seconds, whereas the untreated yarn contracts only 0.077" in this same period of time. The relative superiority in elastic recovery conferred by this treatment is thus 18%.

3. *Swelling.*—Skeins of treated and untreated yarns of known weight are conditioned at 25° C. and 50% R. H. until they are constant in weight. They are thoroughly wet with water, subjected to a short centrifugation and then quickly weighed in a covered dish. The gain in weight of untreated yarn is 100%, while the treated yarn gains only 54% in weight. Relative to untreated yarn, the swellability is reduced by 85%. This modification in properties indicates great improvement in the ease and rapidity of drying of treated fabrics, e. g., after dyeing or laundering procedures.

Nitrocellulose emulsion having, as insolubilizing agents for the adhesive, an ether of N,N'-dimethylol cyclic ureas may be employed. For stability of the emulsion—desirable for convenient use—the cyclic urea dimethylol ether should be incorporated in the oil phase and aluminum chloride should be employed as a catalyst in the water phase. An acceptable emulsion may be prepared as follows:

| | Per cent |
|---|---|
| Oil phase: | |
| Butyl alcohol | 5.8 |
| Butyl acetate | 23.4 |
| Methyl ethyl ketone | 11.5 |
| Castor oil | 5.8 |
| Cellulose nitrate (5 second) | 29.0 |
| Water | 10.0 |
| N,N'-bis(methoxymethyl) uron | 0.6 |
| Water phase: | |
| Polyvinyl alcohol | 0.6 |
| Water | 12.6 |
| Isopropylnaphthalenesulfonate | 0.2 |
| High solvency petroleum naphtha | 0.4 |
| Aluminum chloride | 0.1 |
| | 100.0 |

For purposes of illustration N,N'-bis(methoxymethyl) uron,

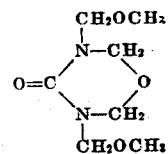

tetrahydro-1,3-bis(methoxymethyl) - 5 - methyl-2(1)-s-triazone,

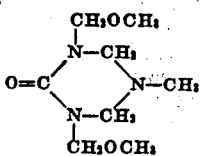

and N,N'-bis(methoxymethyl)ethylene urea

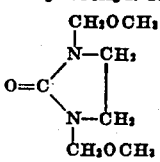

have been used in the above examples. However, there may be employed any compound of the following formula

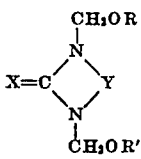

where X is a chalcogen of atomic weight less than 33, i. e., oxygen or sulfur; R and R', which may be identical or different, represent the non-hydroxy portion of a monohydric alcohol boiling below 210° C. at 760 mm.; and, Y is a divalent acyclic organic radical of chain length 2 or 3, both terminal atoms of which are carbon, any other chain member present being carbon, oxygen, sulfur or tertiary nitrogen, and wherein all hydrogen atoms are attached only to carbon.

Among the radicals represented by Y in the above formula, wherein the Y forms, with the etherified N,N'-dimethylolureylene radical, a heterocyclic ring of from 5 to 6 atoms, the most important ones are

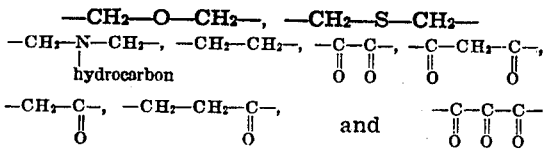

The alcohols corresponding to the radicals R and R' include methyl, ethyl, propyl, isopropyl, butyl, isobutyl, amyl, hexyl, octyl, benzyl, furfuryl, tetrahydrofurfuryl, methoxyethyl, ethoxyethyl alcohols, and in general any monohydric alcohol boiling below 210° C. at 760 mm. Among the compounds which may be employed in the process of this invention are, in addition to those of the examples, 3,5-bis-(methoxymethyl) tetrahydro-1,3,5-thiadiazine-4-one; N,N'-bis-(methoxymethyl)parabanic acid; N,N'-bis(propoxymethyl)barbituric acid; N,N'-bis(amyloxymethyl) hydantoin; N,N' - bis - (ethoxymethyl)hydrouracil; N,N'-bis(methoxymethyl)isobarbituric acid; N,-N'-bis(methoxymethyl)alloxan; N,N'-bis(benzyloxymethyl)uron; N,N'-bis(furyloxymethyl)uron, etc. Of these materials, the preferred ones, from the standpoints of availability and results, are the N,N'-bis(alkoxymethyl)urons, in which the radicals R and R' of the above general formula are hydrocarbon.

The process of this invention may be employed for the insolubilization or otherwise modification, for example crease proofing or elasticization, of any polymeric material containing hydroxyl groups, including in addition to the hydroxylated materials of the examples: cellulose, starch, wood, cellulose derivatives of all descriptions such as partially esterified cellulose esters, e. g., acetates, propionates, butyrates and nitrates, partially etherified cellulose ethers, e. g., methyl- and ethyl-cellulose, and regenerated cellulose. Mixed cellulose esters, e. g., cellulose acetate propionate, acetate butyrate, and acetate stearate may be modified by the process of this invention. Polyvinyl alcohol and polyvinyl alcohol derivatives such as partially hydolyzed polyvinyl acetate or polyvinyl propionate, partially acetalized and ketalized polyvinyl alcohol may be used. Polybasic acid-polyhydric alcohol condensation products containing free hydroxyl groups may also be used, including castor oil modified alkyd resins, and drying oil modified alkyl resins based on an excess of glycol or glycerol. Hydroxylated natural and synthetic rubbers may be used, including hydroxylated neoprene and hydroxylated butadiene polymers and interpolymers.

Mixtures of two different hydroxylated polymeric materials may be rendered insoluble.

Any of the catalysts known to facilitate acetal formation and interchange, e. g., p-toluenesulfonic acid, hydrochloric acid, sulfuric acid, phosphoric acid, zinc chloride, ferric chloride, aluminum chloride, ammonium chloride, boron trifluoride, iodine, sulfonium iodides, etc. may be employed to facilitate the reaction between the bis(alkoxymethyl) urea and the hydroxylated polymer. These catalysts are well known to those skilled in the art.

The effects obtained in the process of this invention are presumably caused by a reaction between the bis(alkoxymethyl)urea and the free hydroxyl groups of the hydroxylated polymer similar to the acetal interchange reaction between an acetal and an alcohol, i. e., a reaction taking place with evolution of the alcohol corresponding to the alkoxy group of the bis(alkoxymethyl)urea. The speed of this reaction varies, depending upon the choice of the hydroxylated polymer and the bis(alkoxymethyl)urea, and it is also a function of the temperature. In this connection it must be emphasized that there is a certain critical temperature below which the reaction does not take place, or at least not within a reasonable length of time, as shown in Example II. It is not possible to state definitely, in terms applicable to any hydroxylated polymer, the temperature below which the reaction leading to insolubilization will not take place. This is apparently due to the difference in the reactivity of the hydroxyl groups in the various hydroxylated polymeric materials. Wide differences in reactivity would be expected since some of these hydroxyl groups are primary and some are secondary; others are influenced by activating groups and still others are sterically hindered. The amount of hydroxyl groups in the hydroxylated polymer also affects the reaction rate; for example, polyvinyl alcohol reacts faster than a hydrolyzed ethylene-vinyl acetate interpolymer, chiefly because of the difference in the percentage of free hydroxyl groups present.

The process of this invention is particularly valuable for the modification of cellulosic fibers and filaments. Regenerated viscose rayon fibers are strong and yield fabrics of attractive appearance, but such fibers and fabrics tend to wrinkle or crease in use, and return to their original shape and appearance only very slowly on standing or when laundered and ironed. When such fibers and fabrics are modified by the process of this invention they are markedly more resilient than the unmodified rayon and tend to wrinkle and crease to a lesser extent. This improved resilience or recovery from deformation is particularly important in pile fabrics such as rugs, carpets, velvets, plush fabrics, etc. Rayon fabrics modified according to the process of this invention are also excellently suited for use as upholstery material, for furniture and automobiles.

Cellulose acetate, as well as other cellulose esters, is widely used in the form of fibers and fabrics, molded articles, etc. However, cellulose acetate products are relatively low melting and readily attacked by many commonly used organic solvents. Hence, wearing apparel made from cellulose acetate fibers must be ironed with extreme care and must not be allowed to come in contact with the ordinary solvents found around the home, e. g., finger-nail polish, alcohol, etc. When such fibers are modified by the process of this invention they are markedly improved in their resistance to solvents and in the safe ironing temperature. Cellulose acetate is widely used in molded articles but this application is limited by the solubility of the product in many solvents. By the process of this invention these molded articles can be rendered substantially insoluble in most solvents. This improvement can readily be imparted to such articles as toothbrush handles which are usually deteriorated by contact with water and other liquids.

Polyvinyl alcohol products are very tough, oil resistant materials, but since they are readily soluble in water they have only limited uses. By the process of this invention the polyvinyl alcohol products can be made highly resistant to water and can then be used for such things as tubes, belts, unsupported films, containers for liquids such as oils, etc., bags for foodstuffs, such as coffee, tea, bread, and the like. Partially acetalized or ketalized polyvinyl alcohol, e. g., polyvinyl butyral (known to the trade as "Butacite"), partially hydrolyzed polyvinyl acetate, partially hydrolyzed vinyl acetate interpolymers and similar compounds have shown promise as adhesives and bonding agents for plywood, etc. Their utility in certain fields is limited because of their low softening temperatures and water sensitivity. Through modification of these materials by the process of this invention, products of much wider application can be obtained. For example, "Butacite" is not entirely satisfactory as a bonding agent for certain plywood structures, e. g., those used in airplane and motor boat construction because the bond formed will not withstand very large shearing stresses at elevated temperatures or in the presence of water. By modifying the polyvinyl butyral with a bis(alkoxymethyl)urea a bond can be formed which will be virtually unaffected by water and resistant to elevated temperatures. The insolubilization of polyvinyl acetals and particularly polyvinyl butyrals, particularly for plywood cementing, is disclosed in greater detail in copending C. W. Johnson application, Serial No. 440,085, filed April 22, 1942. The insolubilization takes place more rapidly and more readily with "Butacite" than is ordinarily the case with hydroxylated polymers.

Other hydroxylated polymeric materials such as hydroxylated rubber, hydroxylated neoprene, hydroxylated nylon, urea-formaldehyde resins, etc., can be rendered more resistant to solvents by treatment with a bis(alkoxymethyl)urea.

The durability of coating compositions, particularly those which contain components possessing hydroxyl groups, e. g., nitrocellulose lacquers, alkyd resins with unreacted hydroxyl groups, etc., can be improved when modified by the process of this invention. This improved durability can be obtained with a wide variety of substrates such as wood, metal, plastics, etc. This remarkable phenomenon is better understood when one considers the probable mechanism through which it occurs. It is quite likely that the bis(alkoxymethyl)urea reacts with the hydroxylated material in the coating composition and/or in the substrate to give a less soluble (more durable) product. In some cases a chemical bond may be formed between the substrate and coating composition through the reaction of a bis(alkoxymethyl)urea with a hydroxyl group in the substrate and a hydroxyl group in the coating composition. The mechanism proposed is given only to permit a better understanding of this phenomenon and should in no way limit the scope of this invention.

Hydroxylated nylon and other forms of modified nylon obtained by treating nylon with formaldehyde, and formaldehyde and alcohols, respectively, have limited application because of undesirable solubility characteristics. These materials are sensitive to both water and organic solvents. If these materials are modified by the process of this invention they can be rendered highly resistant to solvents, hence more desirable for use in coated fabrics, unsupported films, etc.

Urea-formaldehyde resins have limited application because of their inherent low resistance to moisture. By the process of this invention these resins can be rendered substantially more resistant to moisture, acids, and bases.

Novel fabrics can be prepared through the application of the process of this invention by impregnating cloth or other suitable material with a hydroxylated polymeric material, e. g., polyvinyl alcohol, hydrolyzed vinyl acetate interpolymers, etc., and a bis(alkoxymethyl)urea and then heat treating to insolubilize the product. This type of fabric has utility in such applications as seat covers, containers, belts, etc.

The term "chalcogen" is used herein in accordance with the rules for naming inorganic compounds—J. Am. Chem. Soc. 63, 889 (1941)— to denote a member of the oxygen, sulfur, selenium, and tellurium group. Of these, oxygen and sulfur have atomic weights less than 33.

The above description and examples are intended to be illustrative only. Any modification of or variation therefrom which conforms to the spirit of the invention is intended to be included within the scope of the claims.

What is claimed is:

1. A condensation product of a highly polymeric hydroxylated polymer with a monocyclic urea of the formula

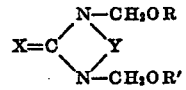

wherein Y is a divalent acyclic organic radical of chain length from two to three atoms, wherein all hydrogen atoms are attached only to carbon, wherein the terminal atoms are carbon, and wherein the chain atoms are selected from the group consisting of carbon, oxygen, sulfur and tertiary nitrogen, X is a chalcogen of atomic weight less than 33, and each of R and R' is a monovalent radical representing the non-hydroxyl portion of a monohydric alcohol ROH boiling below 210° C. at 760 mm., said condensation product being substantially insoluble in solvents for the untreated hydroxylated polymer.

2. A condensation product of a highly polymeric hydroxylated polymer with an N,N'-bis-(alkoxymethyl)uron wherein the alkoxy group is that of an alkanol boiling below 210° C. at 760 mm., said condensation product being substantially insoluble in solvents for the untreated hydroxylated polymer.

3. A condensation product of a highly polymeric hydroxylated polymer with an N,N'-bis-(methoxymethyl)uron, said condensation product being substantially insoluble in solvents for the untreated hydroxylated polymer.

4. A condensation product of a hydroxylated polymer having a cellulosic nucleus and hydroxyls thereon, with an N,N'-bis(alkoxymethyl)uron wherein the alkoxy group is that of an alkanol boiling below 210° C. at 760 mm., said condensation product being substantially insoluble in solvents for the untreated hydroxylated polymer.

5. A condensation product of N,N'-bis(methoxymethyl)uron with a hydroxylated polymer having a cellulosic nucleus and hydroxyls thereon, said condensation product being substantially insoluble in solvents for the untreated hydroxylated polymer.

6. A condensation product of cellulose with N,N'-bis(methoxymethyl)uron.

7. Process which comprises reacting cellulose with N,N'-bis(methoxymethyl)uron at 170° C. for three minutes.

8. Process which comprises reacting cellulose with an N,N'-bis(alkoxymethyl)uron wherein the alkoxy group is that of an alkanol boiling below 210° C. at 760 mm. at a temperature of at least 80° C. but below the decomposition temperature until the cellulose becomes substantially insoluble in cellulose solvents.

9. Process which comprises heating at an elevated temperature but below the decomposition temperature a hydroxylated polymer having a cellulosic nucleus and hydroxyls thereon with an N,N'-bis(alkoxymethyl)uron wherein the alkoxy group is that of an alkanol boiling below 210° C. at 760 mm. until said polymer becomes substantially insoluble in solvents for the untreated polymer.

10. Process which comprises heating, at a temperature of at least about 80° C. but below the decomposition temperature, a hydroxyl containing polymer having a cellulosic nucleus and hydroxyls thereon with an N,N'-bis(alkoxymethyl)-uron wherein the alkoxy group is that of an alkanol boiling below 210° C. at 760 mm. until said hydroxyl containing polymer is insoluble in solvents for the untreated polymer.

11. Process which comprises heating at an elevated reaction temperature but below the decomposition temperature, a hydroxyl containing high polymer with a monocyclic urea of the formula

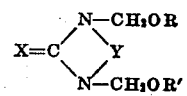

wherein Y is a divalent acyclic organic radical of chain length from two to three atoms, wherein all hydrogen atoms are attached only to carbon, wherein the terminal atoms are carbon, and wherein the chain atoms are selected from the group consisting of carbon, oxygen, sulfur and tertiary nitrogen, X is a chalcogen of atomic weight less than 33, and each of R and R' is a monovalent radical representing the non-hydroxyl portion of a monohydric alcohol ROH which boils not higher than 210° C. at 760 mm., until said hydroxyl containing polymer is insoluble in solvents for the untreated polymer.

12. Process which comprises heating, to a temperature sufficiently elevated to cause alcohol evolution but below the decomposition temperature, a highly polymeric hydroxylated polymer with a monocyclic urea of the formula

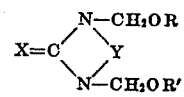

wherein Y is a divalent acyclic organic radical of chain length from two to three atoms, wherein all hydrogen atoms are attached only to carbon, wherein the terminal atoms are carbon, and wherein the chain atoms are selected from the group consisting of carbon, oxygen, sulfur and tertiary nitrogen, X is a chalcogen of atomic weight less than 33, and each of R and R' is a monovalent radical representing the non-hydroxyl portion of a monohydric alcohol ROH boiling not higher than 210° C. at 760 mm., until said polymer becomes essentially insoluble in solvents for the untreated polymer.

ROBERT WILLIAM MAXWELL.